United States Patent [19]

Janeiro

[11] Patent Number: 5,335,444
[45] Date of Patent: Aug. 9, 1994

[54] TREBLE HOOK PROTECTOR

[76] Inventor: Joe C. Janeiro, 325 Mary St Unit #1, Hamilton, Ontario, Canada, L8L 8A2

[21] Appl. No.: 35,657

[22] Filed: Mar. 23, 1993

[51] Int. Cl.⁵ .............................. A01K 97/06
[52] U.S. Cl. .................................... 43/57.1
[58] Field of Search ........................... 43/57.1

[56] References Cited

U.S. PATENT DOCUMENTS

| | | | |
|---|---|---|---|
| 2,204,185 | 6/1940 | Lougheed | 43/57.1 |
| 2,616,209 | 11/1952 | Ploen | 43/57.1 |
| 4,667,433 | 5/1987 | Thompson, Jr. | 43/57.1 |
| 5,123,199 | 6/1992 | Lysohir et al. | 43/57.1 |

Primary Examiner—P. Austin Bradley
Assistant Examiner—Jeanne M. Elpel
Attorney, Agent, or Firm—Gary Alan Culliss

[57] ABSTRACT

A protector for a treble hook while in storage which comprises a plastic box completely enclosing each point of the hook. The protector is designed to provide for easy insertion of the hook and to resist accidental exposure of the hook.

4 Claims, 3 Drawing Sheets

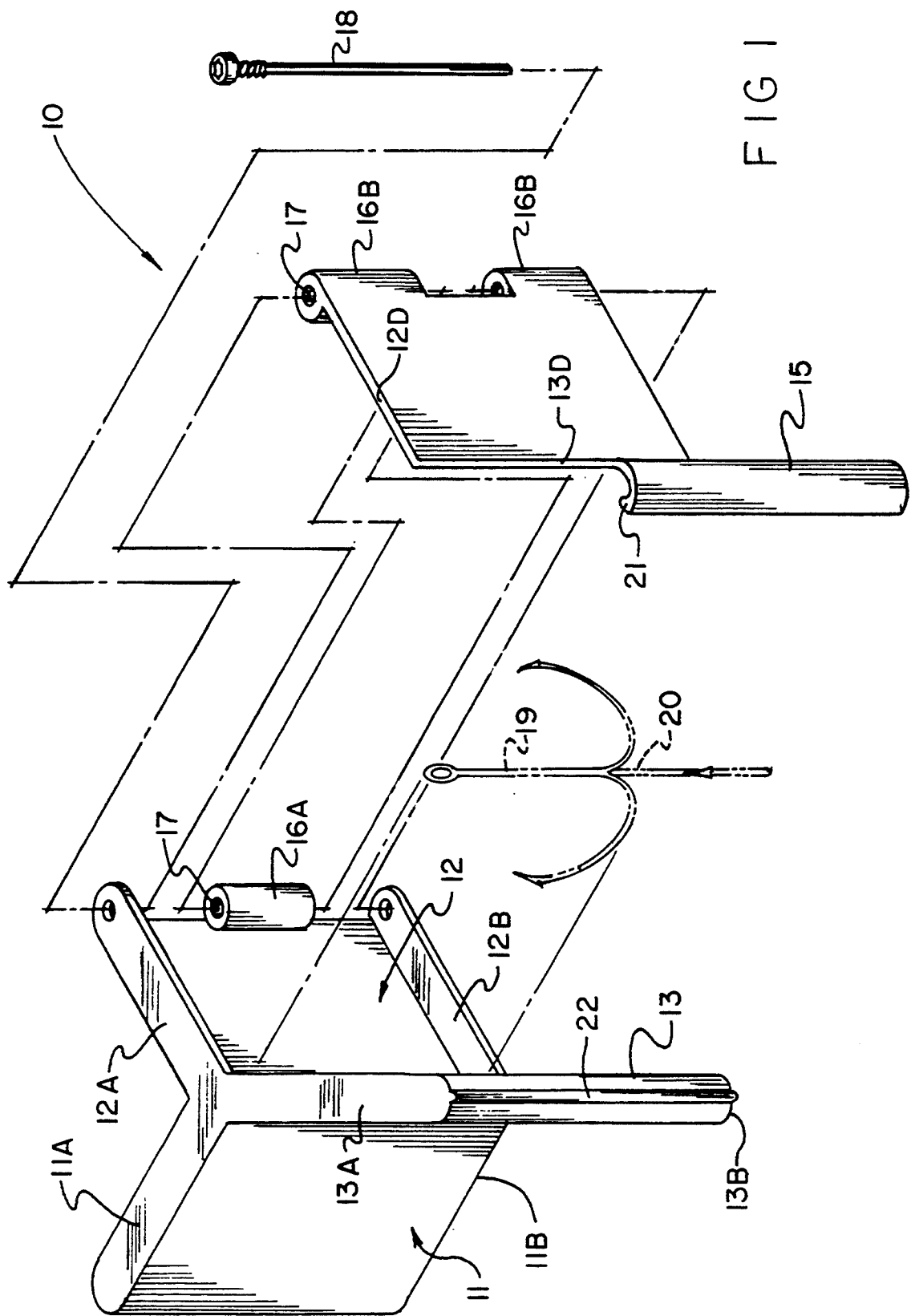

TREBLE HOOK PROTECTOR

BACKGROUND OF THE INVENTION

1. Field of the Invention

The present invention relates to hook protectors and more particularly pertains to a protector which especially adapted for use with treble hooks.

2. Description of the Prior Art

Relevant prior art located includes U.S. Pat. Nos. 4,833,814; 3,940,873; and 3,670,445.

The use of hook protectors is known in the prior art. More specifically, devices heretofore devised and utilized for the purpose of protecting a hook while not in use are known to consist basically of familiar, expected and obvious structural configurations, notwithstanding the myriad of designs encompassed by the crowded prior art which have been developed for the fulfillment of countless objectives and requirements. Most of such protectors can be accidentally dislodged and many are difficult to properly seat the hooks therein.

In this respect, the protector according to the present invention substantially departs from the conventional concepts and designs of the prior art, and in so doing provides an apparatus primarily developed for the purpose of easy application and difficult accidental displacement.

Therefore, it can be appreciated that there exists a continuing need for new and improved hook protectors which can be depended upon to remain in place until intentionally removed. In this regard, the present invention substantially fulfills this need.

SUMMARY OF THE INVENTION

It is therefore an object of the present invention to provide a new and improved treble hook protector which has all the advantages of the prior art devices and none of the disadvantages.

It is another object of the present invention to provide a new and improved hook protector which may be easily and efficiently manufactured and marketed.

It is a further object of the present invention to provide a new and improved hook protector which is of a durable and reliable construction.

An even further object of the present invention is to provide a new and improved hook protector which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved treble hook protector which provides in the apparatuses and methods of the prior art some of the advantages thereof, while simultaneously overcoming some of the disadvantages normally associated therewith.

Still another object of the present invention is to provide a new and improved treble hook protector.

Yet another object of the present invention is to provide a new and improved treble hook protector which completely encloses the protected hook.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an exploded perspective view of the device of the present invention also illustrating a treble hook (shown in dotted lines) in proper relationship for insertion into such device.

DESCRIPTION OF THE PREFERRED EMBODIMENT

Figure 3:
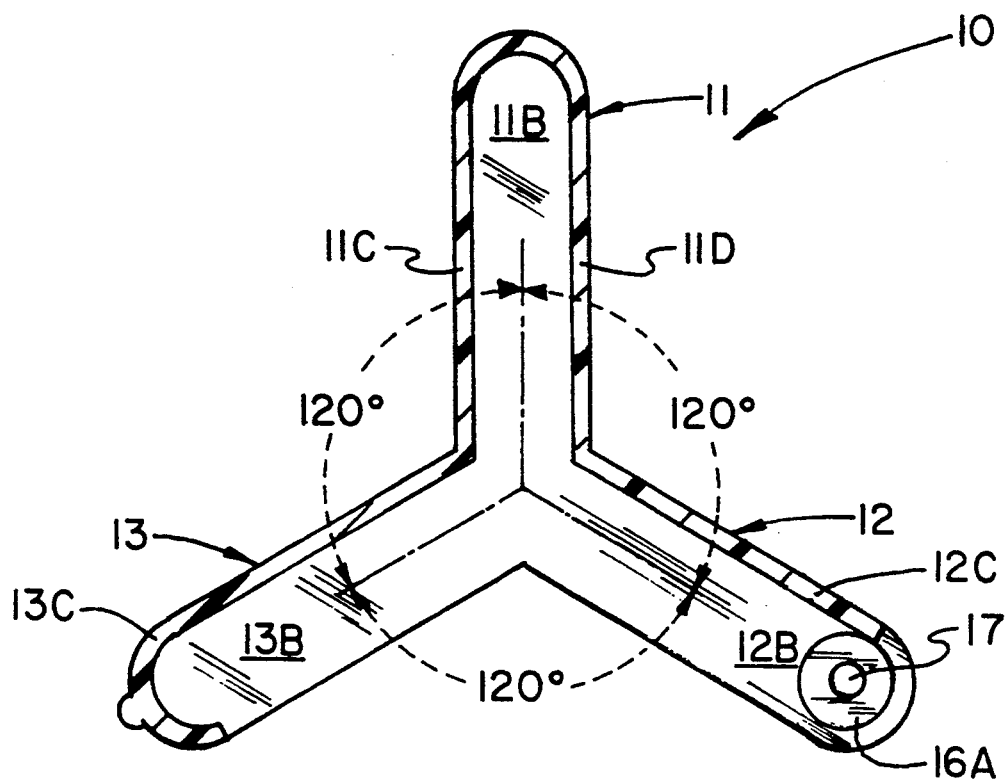
FIG. 3 is a sectional top view taken on line 3—3 of FIG. 2.

With reference now to the drawings, and in particular to FIG. 1 thereof, a new and improved treble hook protector embodying the principles and concepts of the present invention and generally designated by the reference numeral 10 will be described.

More specifically, it will be noted that the device 10 has three compartments 11, 12, 13 disposed at 120 degree angles one to the other. Each compartment is closed at the top and bottom as at 11A and 11B, and 12A and 12B, and 13A and 13B. One of the compartments 11 has sides 11C and 11D fixedly secured to the top and bottom 11A and 11B, as best illustrated in FIG. 3. Similarly, the other two compartments 12 and 13 each have a fixed side 12C and 13C, but also include a movable side 12D and 13D respectively. As shown in FIG. 1, such movable sides 12D and 13D are fixedly engaged with each other and are pivotally connected to compartments 11, 12, and 13 by means of a 2-piece hinge member 16A and 16B. The hinge member components 16A and 16B each have a central aperture 17 adapted to receive a hinge pin 18. When the movable sides 12D and 13D are swung closed they complete the enclosure of compartments 11, 12, and 13.

The fixed sides 11C, 11D, 12C, and 13C of respective compartments 11, 12, and 13 are preferably formed of a substantially rigid plastic material while the movable sides 12D and 13D are formed from a flexible, deformable plastic. This will permit a shank 19 of a treble hook 20 to extend beyond the compartment tops 11A, 12A and 13A if desired by deformation of the movable sides 12D and 13D by shank 19 in case the treble hook is attached to a lure. Obviously, as shown, the compartments 11, 12, and 13 may be sized to also accommodate shank 19 therein if desired (as in the case of an unattached treble hook). Should the treble hook 20 be disengaged from a lure and stored fully within the device 10 as described above, the hook will then be protected from exposure to the elements which could result in a corrosion of the hook and a subsequent loss of the hook's utility.

Figure 2:
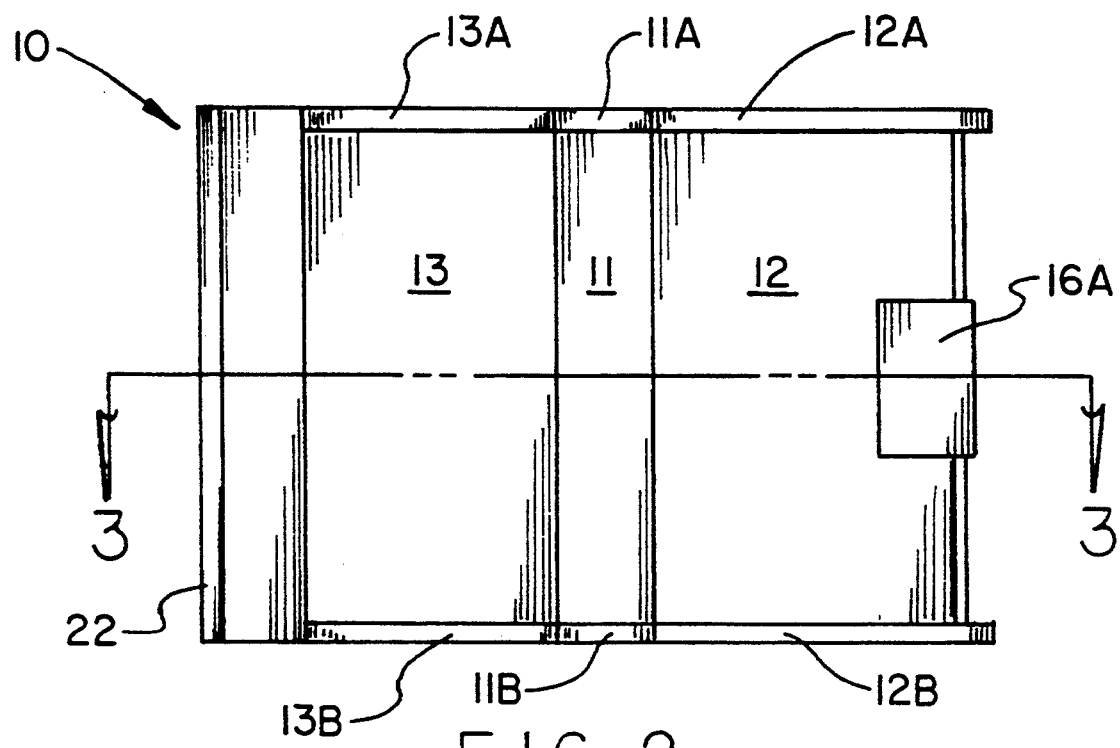
FIG. 2 is a side elevation view of a portion of the device of the present invention.

FIG. 2 is a side elevation view of the fixed side portion of the device 10 showing compartments 11, 12, and 13 and hinge member 16A.

FIG. 3 shows in a top sectional view on line 3—3 of FIG. 2 the trefoil assembly of the compartments 11, 12, and 13. Hinge component 16A illustrates the central aperture 17 therein. This view more clearly shows the 120° disposition of the compartments one to the other.

Figure 4:
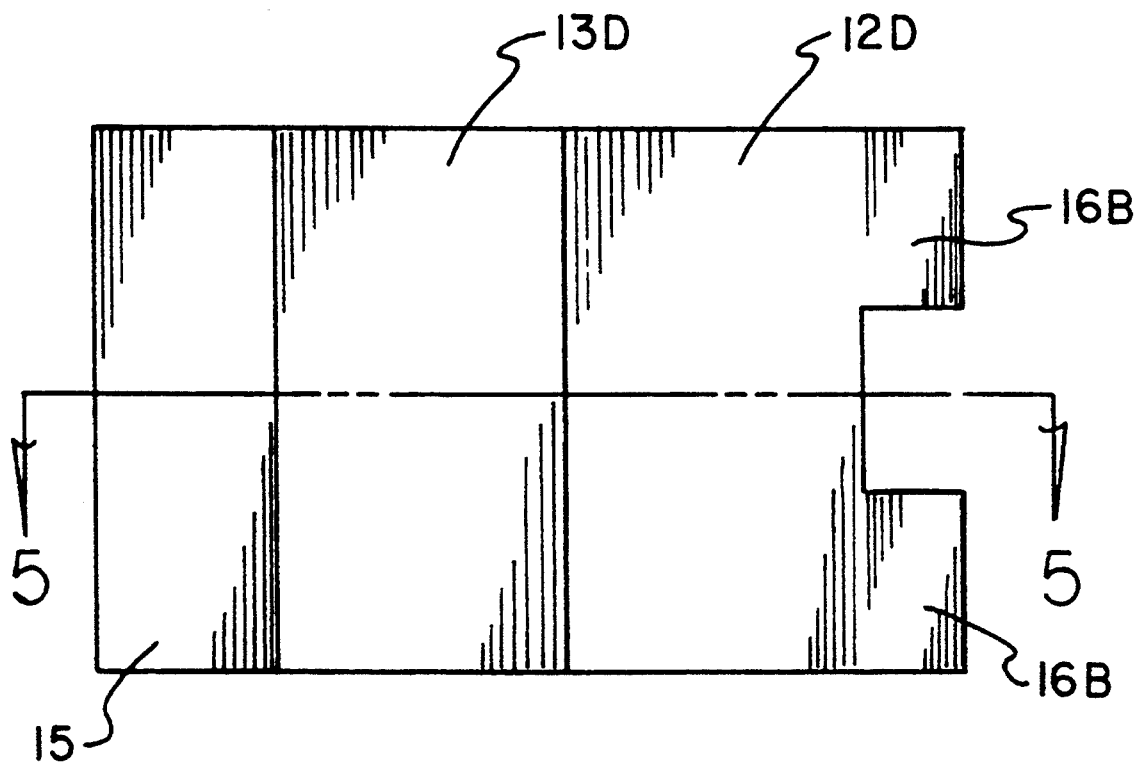
FIG. 4 is a side elevation view of the remaining portion of the device not shown in FIG. 2.

FIG. 4 is a side elevation view of the movable sides 12D and 13D along with hinge members 16B. This view also illustrates the closure side 13A for compartment 13 (not visible in the other Figures).

Figure 5:
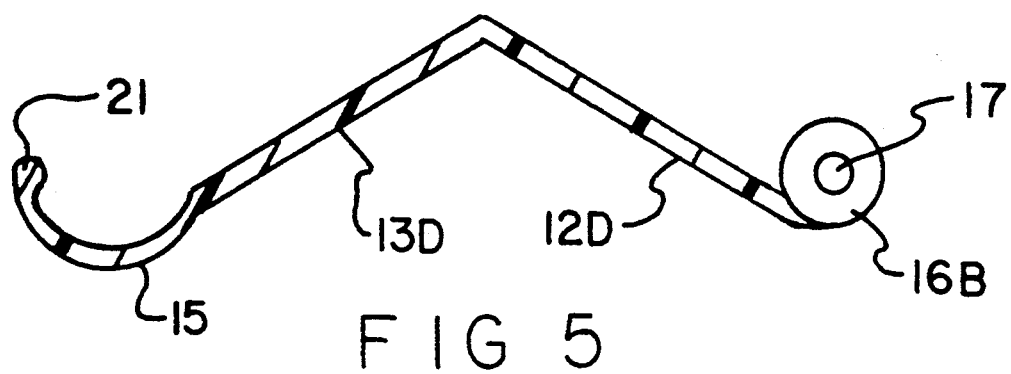
FIG. 5 is a top sectional view taken on line 5—5 of FIG. 4.

FIG. 5 taken as a sectional view on line 5—5 of FIG. 4 shows movable sides 12D and 13D along with hinge member 16B and its associated aperture 17. Also, most clearly shown in this Figure, a side closure 15 is shown with the enlarged segment or closure tab 21 thereon. When the unit is closed up tab 21, because of the flexible or deformable nature of the material forming the movable sides 12D and 13D, will snap over a mating ridge 22 of compartment 13 providing frictional resistance to accidental disengagement therewith.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A treble hook protector comprising:
   a top member being substantially flat and defining a trefoil shape;
   a bottom member being substantially identically shaped with respect to said top member;
   a first compartment having a pair of substantially parallel, spaced first sides each fixedly secured at a top end thereof to said top member, said sides each being further fixedly secured at a bottom end thereof to said bottom member, said sides each having inboard and outboard ends wherein said first sides curve towards each other and connect at said outboard ends thereof;
   a second compartment fixedly secured to said first compartment and orientated 120 degrees relative to said first compartment, said second compartment having a second side fixedly secured at a top end thereof to said top member, said second side being further fixedly secured at a bottom end thereof to said bottom member, said second side having inboard and outboard ends wherein said inboard end of said second side is fixedly secured to said inboard end of one of said first sides;
   a third compartment fixedly secured to said first compartment and orientated 120 degrees relative to both said first compartment and said second compartment, said third compartment having a third side fixedly secured at a top end thereof to said top member, said third side being further fixedly secured at a bottom end thereof to said bottom member, said third side having inboard and outboard ends wherein said inboard end of said third side is fixedly secured to said inboard end of one of said first sides;
   a first movable side having inboard and outboard ends, said outboard end of said first movable side being pivotally coupled to said outboard end of said second side of said second compartment;
   a second movable side having inboard and outboard ends, said inboard end of said second movable side being fixedly secured to said inboard end of said first movable side to define an angle of approximately 120 degrees between said first and second movable sides;
   a ridge coupled to a portion of said third compartment; and,
   a closure tab coupled to said outboard end of said second movable side, said closure tab being releasably engagable to said ridge to facilitate a complete enclosing of a treble hook positioned within said compartments.

2. A treble hook protector for enclosing a treble hook having three hook points and a shank, said protector comprising a first compartment; a second compartment coupled to said first compartment; and a third compartment coupled to both said first compartment and said second compartment, said compartments being arranged in a radially spaced manner such that each compartment may receive one of said three hook points, said compartments having a height greater than a height of said shank, whereby said treble hook may be completely contained within said treble hook protector, wherein said first compartment comprises a pair of sides positioned in a parallel, spaced relationship; a top member fixedly secured to a top end of each of said pair of sides; and a bottom member fixedly secured to a bottom end of each of said sides, and said second and third compartments each comprise a pair of sides positioned in a parallel, spaced relationship; a top member fixedly secured to a top end of an individual one of said pair of sides; and a bottom member fixedly secured to a bottom end of an individual one of said sides, wherein said top members of said compartments are integrally connected together to define a substantially trefoil shape, and further wherein said bottom members of said compartments are integrally connected together to define a shape substantially identical to said top member.

3. A treble hook protector for enclosing a treble hook having three hook points and a shank, said protector comprising a first compartment; a second compartment coupled to said first compartment; a third compartment coupled to both said first compartment and said second compartment, said compartments being arranged in a radially spaced manner such that each compartment may receive one of said three hook points, said compartments having a height greater than a height of said shank, whereby said treble hook may be completely contained within said treble hook protector; and a movable side means pivotally connected to one of said compartments for facilitating an insertion and removal of said treble hook from said treble hook protector, wherein said first compartment comprises a pair of first compartment sides positioned in a parallel, spaced relationship; a top member fixedly secured to a top end of each of said pair of first compartment sides; and a bottom member fixedly secured to a bottom end of each of said pair of first compartment sides, said second compartment comprises a second compartment side fixedly secured at a top end thereof to said top member, said second compartment side being further fixedly secured at a bottom end thereof to said bottom member, said third compartment comprises a third compartment side fixedly secured at a top end thereof to said top member, said third compartment side being further fixedly secured at a bottom end thereof to said bottom member, and said movable side means comprises a hinge coupled to said second compartment; a first movable side coupled to said hinge; and a second movable side fixedly secured at an edge thereof to an edge of said first movable side.

4. The treble hook protector of claim 3, wherein said movable side means further comprises a closure tab coupled to said second movable side; and a mating ridge coupled to said third compartment, whereby said closure tab may be releasably coupled to said mating ridge to secure said movable side means.

* * * * *